United States Patent
Huang

(10) Patent No.: US 10,483,691 B2
(45) Date of Patent: Nov. 19, 2019

(54) CARD HOLDER, INSERTING DEVICE AND TERMINAL

(71) Applicant: GUANGDONG OPPO MOBILE TELECOMMUNICATIONS CORP., LTD., Dongguan (CN)

(72) Inventor: Hanjie Huang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 89 days.

(21) Appl. No.: 15/852,286

(22) Filed: Dec. 22, 2017

(65) Prior Publication Data
US 2018/0309234 A1  Oct. 25, 2018

(30) Foreign Application Priority Data

Apr. 19, 2017  (CN) .......................... 2017 1 0258883
Apr. 19, 2017  (CN) .......................... 2017 2 0416076

(51) Int. Cl.
 *H05K 7/16* (2006.01)
 *H01R 13/629* (2006.01)
 *H01R 13/639* (2006.01)

(52) U.S. Cl.
CPC ......... *H01R 13/629* (2013.01); *H01R 13/639* (2013.01); *H01R 2201/16* (2013.01)

(58) Field of Classification Search
USPC ....................................... 361/727
See application file for complete search history.

(56) References Cited

U.S. PATENT DOCUMENTS

| 9,125,316 | B2 * | 9/2015 | Hsu ...................... H05K 7/1417 |
| 2013/0252470 | A1 | 9/2013 | Lin et al. |
| 2014/0016275 | A1 | 1/2014 | Takasaki et al. |
| 2014/0362548 | A1 * | 12/2014 | Liu .......................... G06F 1/16 361/754 |

FOREIGN PATENT DOCUMENTS

CN  104300305  1/2015
CN  204720601  10/2015
(Continued)

OTHER PUBLICATIONS

English translation of the ISR/WO for PCT Application CN2018071378, Apr. 3, 2018.
(Continued)

*Primary Examiner* — Hung S. Bui
(74) *Attorney, Agent, or Firm* — Hodgson Russ LLP

(57) ABSTRACT

The present disclosure provides a card holder, an inserting device and a terminal. The card holder is configure to install a data card, and includes a card tray, a sliding block and an elastic element. The card tray defines a card slot and a sliding groove, the card slot is configured to receive the data card, and the sliding groove is in communication with the card slot. The sliding block is capable of sliding along the sliding groove. The elastic element is coupled to the sliding block, fixed to the card tray, and configured to press the sliding block to make the sliding block abut against the data card when the elastic element is in a deformation state. The inserting device includes a card socket and the card holder. The terminal includes the card holder.

20 Claims, 6 Drawing Sheets

(56) References Cited

FOREIGN PATENT DOCUMENTS

| | | |
|---|---|---|
| CN | 106450881 | 2/2017 |
| CN | 206148756 | 5/2017 |
| CN | 106953653 | 7/2017 |
| CN | 206743227 | 12/2017 |
| EP | 2821939 | 1/2015 |
| JP | 2013222653 | 10/2013 |
| TW | M469642 | 1/2014 |

OTHER PUBLICATIONS

EPO, Office Action for EP Application No. 18150569, Jul. 2, 2018.

\* cited by examiner

CARD HOLDER, INSERTING DEVICE AND TERMINAL

CROSS-REFERENCE TO RELATED APPLICATION

This application claims priority to and benefits of Chinese Patent Application Serial No. 201710258883.X, filed with the State Intellectual Property Office of P. R. China on Apr. 19, 2017, and No. 201720416076.1 filed with the State Intellectual Property Office of P. R. China on Apr. 19, 2017, the entire content of which are incorporated herein by reference.

FIELD

The present disclosure relates to a technical field of electronic equipment, and more particularly, to a card holder, an inserting device and a terminal.

BACKGROUND

A data card is usually placed on a card holder, and the card holder with the data card is then disposed in a card socket, so as to achieve electric connection between the data card and an electronic device. However, after the card holder is taken out of the card socket, a coupling between the data card and the card holder is not stable enough, and the data card is easily detached from the card holder and falls off when the card holder is flipped over.

SUMMARY

Embodiments of the present disclosure provide a card holder, an inserting device and a terminal.

The card holder according to embodiments of the present disclosure includes a card tray defining a card slot and a sliding groove in communication with the card slot, the card slot being configured to receive the data card; a sliding block capable of sliding along the sliding groove; and an elastic element coupled to the sliding block, fixed to the card tray, and configured to press the sliding block to make the sliding block abut against the data card when the elastic element is in a deformation state.

The inserting device according to embodiments of the present disclosure includes a card socket defining an accommodating space; and a card holder according to any one of the above embodiments, capable of being movably inserted into or drawn out of the accommodating space.

The terminal according to embodiments of the present disclosure includes a card holder according to any one of the above embodiments.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
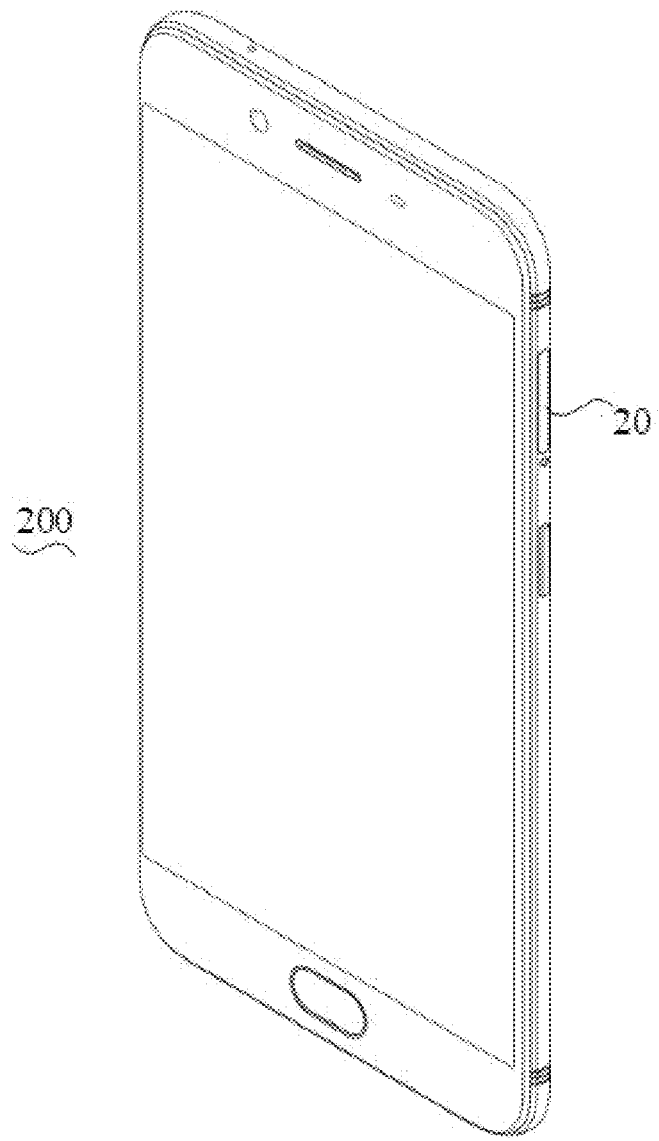
FIG. 1 illustrates a perspective view of a terminal according to an embodiment of the present disclosure.
Figure 2:
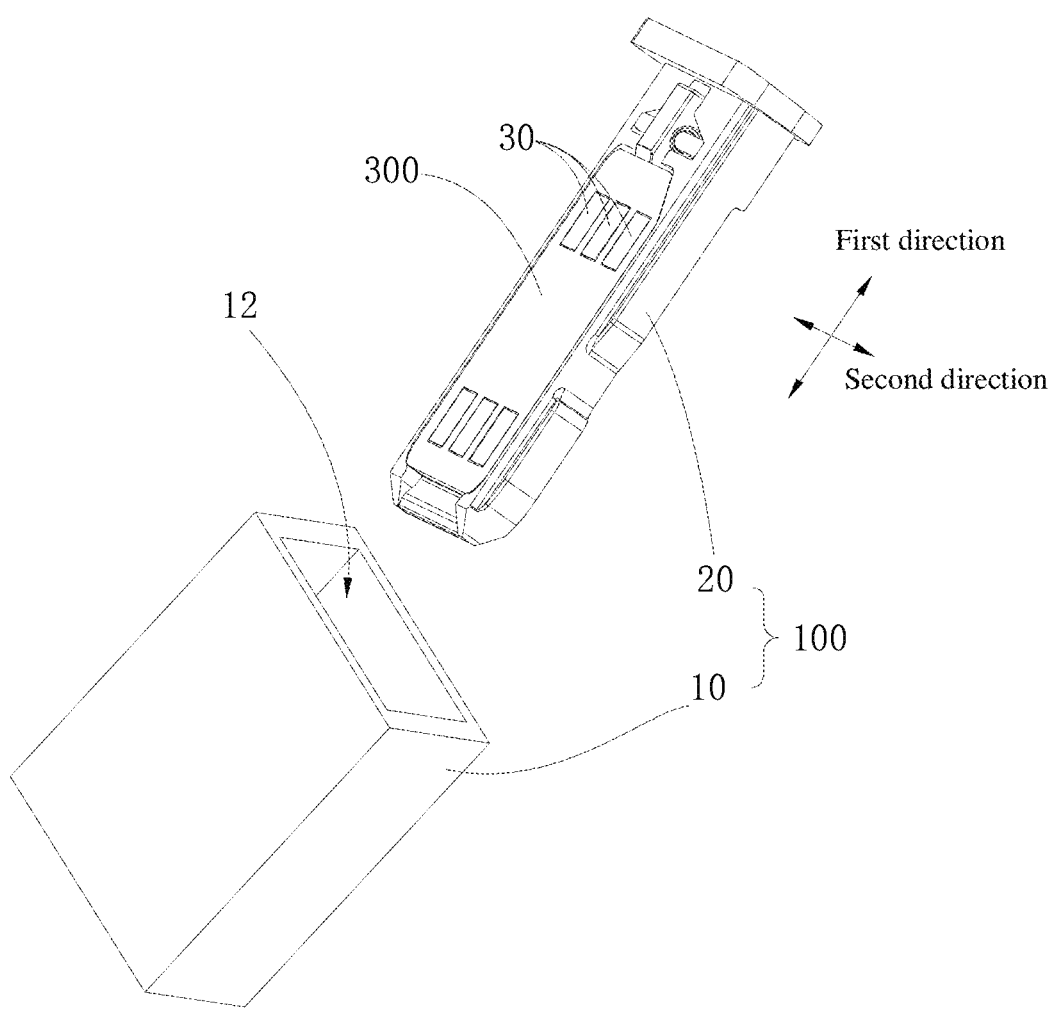
FIG. 2 illustrates a perspective view of an inserting device according to an embodiment of the present disclosure.

Inserting device 100, card socket 10, accommodating space 12, card holder 20, card tray 21, card slot 211, upper card slot 2111, lower card slot 2112, sliding groove 212, first side wall 213, second side wall 214, third side wall 215, end portion 2152, middle portion 2154, fourth side wall 216, upper surface 217, lower surface 218, fixing groove 219, first wall 2191, second wall 2192, partition plate 21a, sliding block 22, abutting surface 222, elastic element 23, handle 24, terminal 200, metal contact 30, data card 300.

DETAILED DESCRIPTION

Embodiments of the present disclosure will be further described with reference to accompanying drawings. The same or similar elements and the elements having same or similar functions are denoted by like reference numerals throughout the description.

In addition, the embodiments described herein with reference to the drawings are explanatory, which aim to illustrate the embodiments of the present disclosure, but shall not be construed to limit the present disclosure.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "some embodiments," "one embodiment," "some embodiments," "an example," "a specific example" or "some examples" means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples. Moreover, those skilled in the art can combine different embodiments or examples described in this specification as well as features of different embodiments or examples on the premise of no mutual contradictions.

Referring to FIGS. 1 to 4, a card holder 20 according to embodiments of the present disclosure is configured to install a data card 300, and includes a card tray 21, a sliding block 22 and an elastic element 23. The data card 300 can be a SIM card, a TF card, a SD card or the like. An inserting device 100 according to embodiments of the present disclosure includes the card holder 20 and a card socket 10, the card socket 10 defines an accommodating space 12, and the card holder 20 can be movably inserted into or drawn out of the accommodating space 12. Specifically, the card holder 20 can be completely or partially drawn out of the card socket 10, and after the data card 300 is installed in the card holder 20, the card holder 20 is then pushed into the card socket 10. Further, the card socket 10 also includes a contact terminal (not illustrated), and when the data card 300 is installed in the card holder 20 and pushed into the accommodating space 12, the contact terminal makes contact with a metal contact 30 of the data card 300 so that the contact terminal can read data from or write data into the data card 300.

A terminal 200 according to embodiments of the present disclosure includes the card holder 20. Further, the terminal 200 also includes the card socket 10. The terminal 200 may be various devices that can acquire data from the data card 300 and process the data, or that can import data into the data card 300, and for example, the terminal 200 can be a mobile phone, a tablet computer, a computing device, an information display device, or the like.

Figure 5:
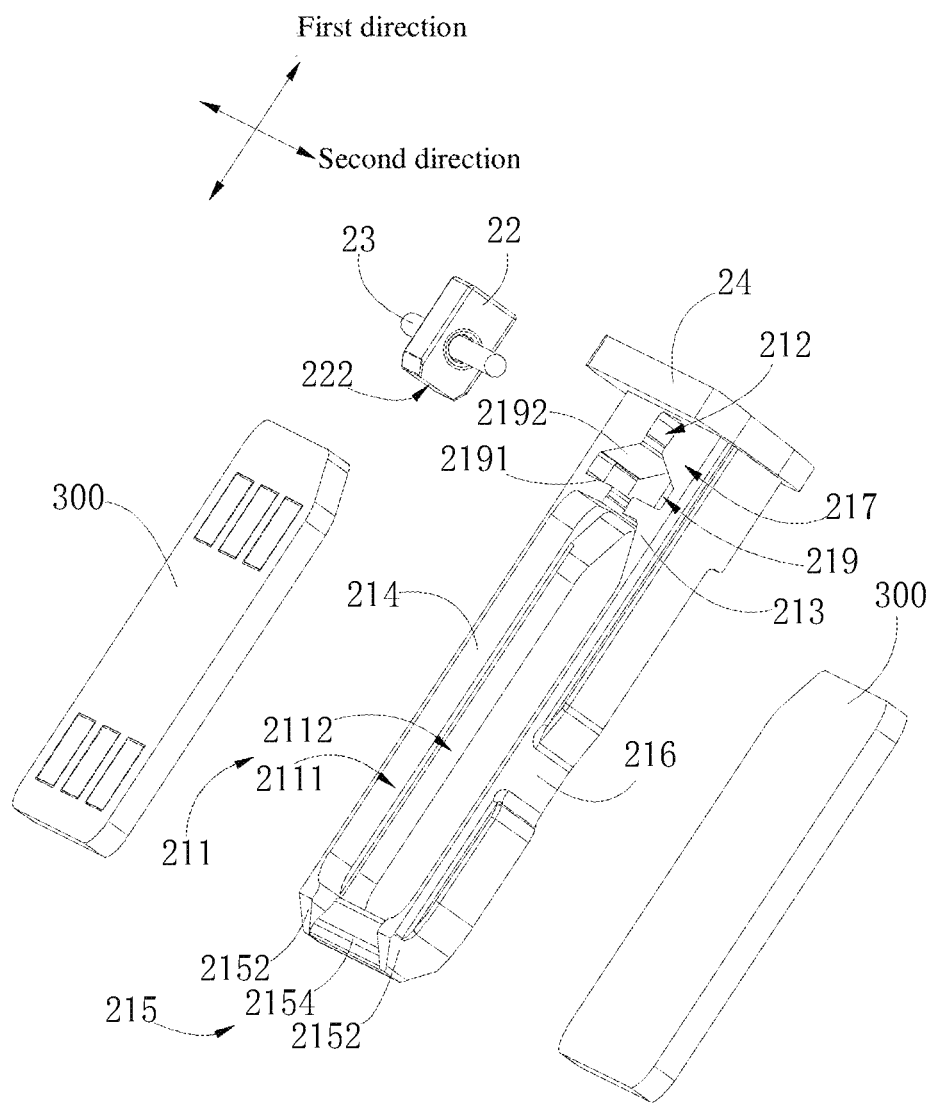
FIG. 5 illustrates a perspective exploded view of a card holder according to an embodiment of the present disclosure.
Figure 6:
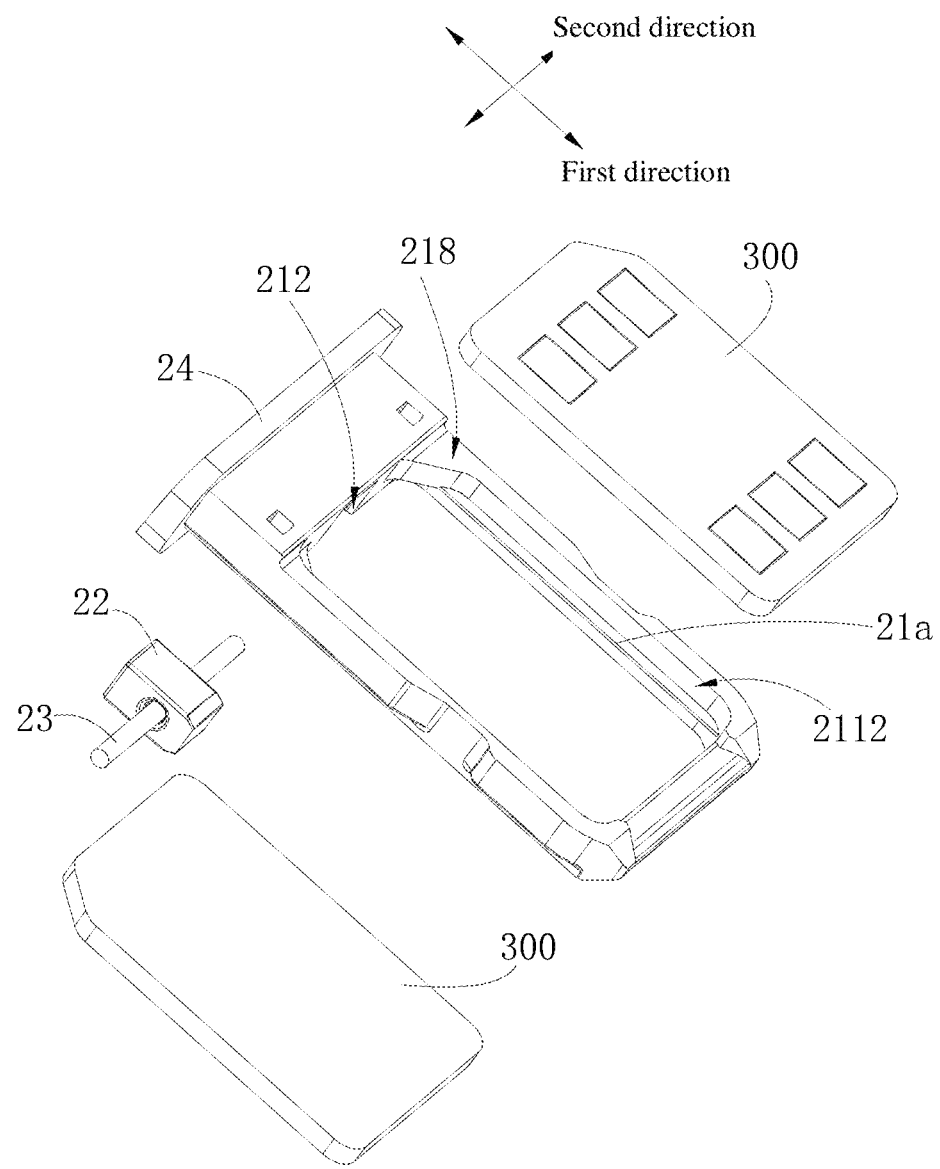
FIG. 6 illustrates a perspective exploded view of a card holder according to an embodiment of the present disclosure.

Referring to FIG. 5 and FIG. 6 together, the card tray 21 defines a card slot 211 and a sliding groove 212. The card slot 211 is configured to receive the data card 300, and the card slot 211 is in communication with the sliding groove 212. Specifically, the card tray 21 exhibits a rectangular parallelepiped shape overall, and the card slot 211 is defined by four side walls coupled end to end, the side walls including a first side wall 213, a second side wall 214, a third side wall 215 and a fourth side wall 216. When the card holder 20 needs to be pushed into the card socket 10, the third side wall 215 is first inserted into the accommodating space 12, and then the card holder 20 is pushed into the card socket 10 along a first direction. The first side wall 213 and the third side wall 215 are opposite and extend along a second direction; the second side wall 214 and the fourth side wall 216 are opposite and extend along the first direction; the third side wall 215 is the side wall inserted deepest when the card holder 20 is inserted into the accommodating space 12, while the first side wall 213 is the side wall inserted most shallowly when the card holder 20 is inserted into the accommodating space 12; the second side wall 214 couples a first end of the first side wall 213 and a first end of the third side wall 215, while the fourth side wall 216 couples a second end of the first side wall 213 and a second end of the third side wall 215. The first direction refers to a direction in which the card holder 20 is inserted into the card socket 10, the second direction is intersected with the first direction, and specifically the second direction is perpendicular to the first direction.

Respective thicknesses of the first side wall 213, the second side wall 214 and the fourth side wall 216 can be equal, so as to allow the card holder 20 to be inserted into the card socket 10 easily. The third side wall 215 includes two end portions 2152 coupled to the second side wall 214 and the fourth side wall 216 correspondingly, and a middle portion 2154 coupling the two end portions 2152. A height of each end portion 2152 is equal to a height of the second side wall 214 and a height of the fourth side wall 216, correspondingly, so as to make it convenient for the two end portions 2152 to abut against the data card 300 to assist in fixing the data card 300. A height of the middle portion 2154 is lower than the height of each end portion 2152, such that the contact terminal can conveniently extend into the card slot 211 from the middle portion 2154 and make contact with the metal contact 30. Further, a side of the middle portion 2154 away from the card slot 211 defines a chamfer, so as to facilitate insertion of the contact terminal from the middle portion 2154 into the card slot 211.

Figure 3:
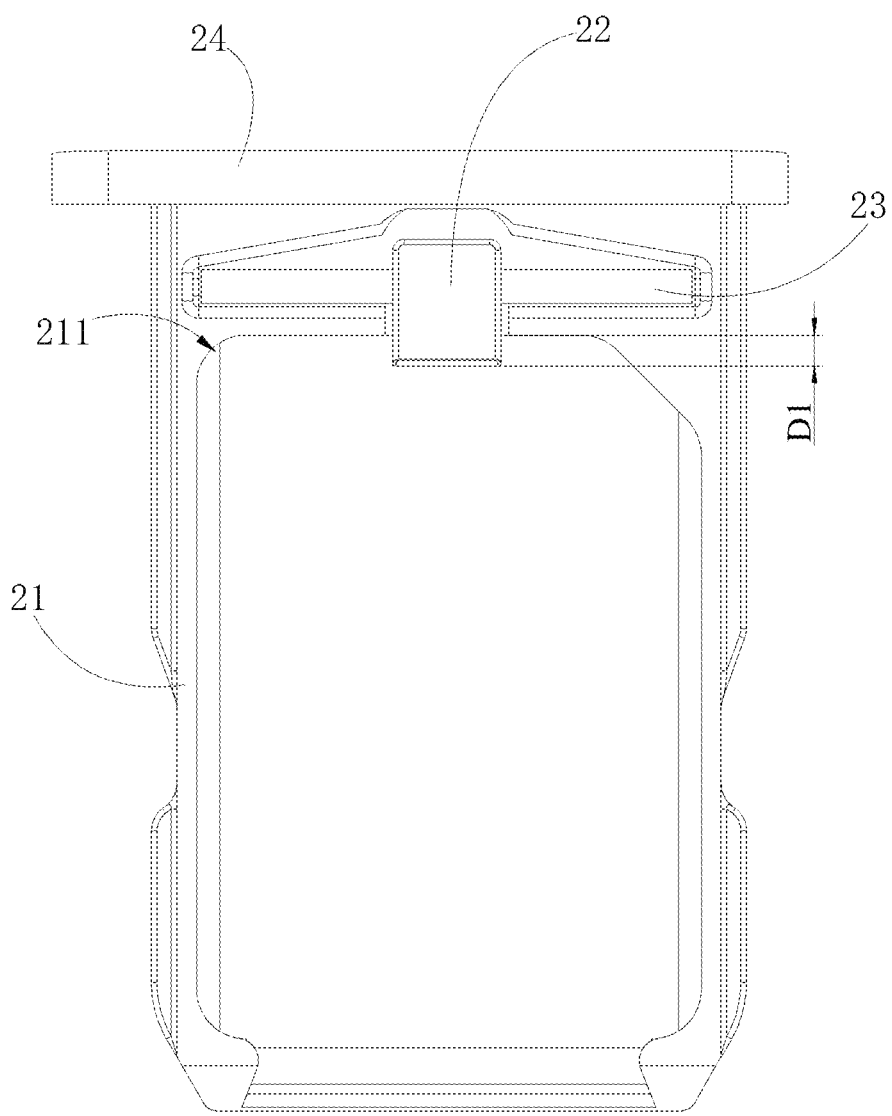
FIG. 3 illustrates a plan view of a card holder in a state where a data card is not installed according to an embodiment of the present disclosure.
Figure 4:
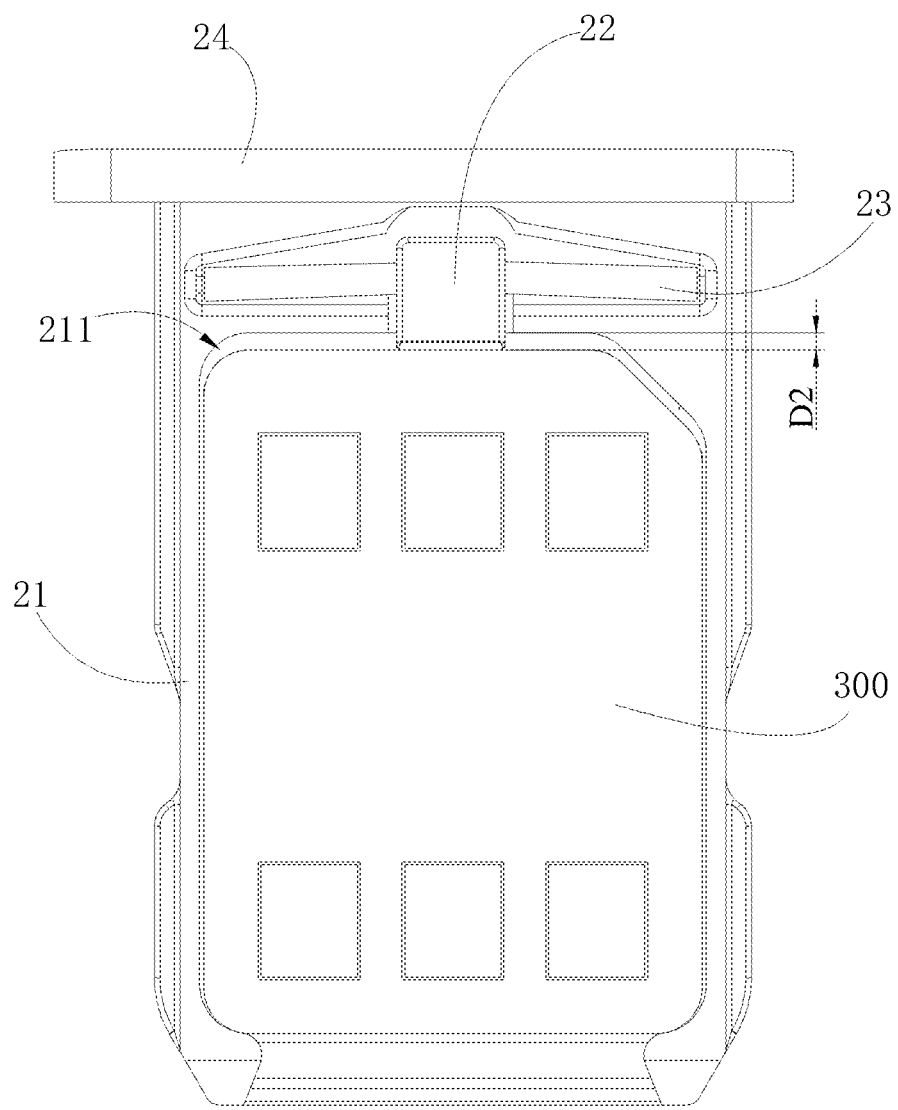
FIG. 4 illustrates a plan view of a card holder in a state where a data card is installed according to an embodiment of the present disclosure.

Referring to FIG. 3 and FIG. 4 together, the sliding block 22 is able to slide along the sliding groove 212 and abut against the data card 300 when the data card 300 is received in the card slot 211. Specifically, the sliding groove 212 extends along the first direction, and the sliding block 22 can slide in the sliding groove 212 along the first direction. The sliding block 22 includes an abutting surface 222, and abuts against the data card 300 by means of the abutting surface 222. When the data card 300 is not received in the card slot 211, the sliding block 22 is inserted into the card slot 211 by a first depth D1 along the first direction; when the data card 300 is received in the card slot 211, the sliding block 22 is inserted into the card slot 211 by a second depth D2 along the first direction, and the first depth D1 is greater than the second depth D2. Certainly, the second depth D2 may vary as different data cards 300 have different sizes. Further, the abutting surface 222 defines a limiting groove (not illustrated) in a position corresponding to the data card 300, and when the data card 300 is to be installed, a first side of the data card 300 is aligned with the limiting groove and the data card 300 is installed in the card slot 211, such that the limiting groove further limits the position of the data card 300, thereby avoiding slippage of the data card 300 on the abutting surface 222.

The elastic element 23 is coupled to the sliding block 22, and configured to press the sliding block 22 in a deformation state so that the sliding block 22 abuts against the data card 300. Specifically, the elastic element 23 and the sliding block 22 can be integrally formed or separately formed, respective materials of the elastic element 23 and the sliding block 22 can be consistent or inconsistent, and the elastic element 23 can be fixedly or movably coupled to the sliding block 22. It could be understood that the elastic element 23 can be transformed between a natural state and a deformation state, and when the card slot 211 hasn't received the data card 300, the elastic element 23 is in the natural state and does not press the sliding block 22, and thus the sliding block 22 is inserted into the card slot 211 by the first depth D1 along the first direction. When the data card 300 needs to be installed in the card slot 211, the first side of the data card 300 abuts against the abutting surface 222 and urges the sliding block 22 to slide in the sliding groove 212 to reach the second depth D2 by which the sliding block 22 is inserted into the card slot 211 along the first direction, and a second side of the data card 300 abuts against the two end portions 2152 of the third side wall 215, such that the data card 300 is received in the card slot 211, the elastic element 23 is in the deformation state and presses the sliding block 22 along the first direction, and the data card 300 is firmly installed in the card slot 211 under the abutting action of the sliding block 22 and the end portions 2152.

In the card holder 20, the inserting device 100 and the terminal 200 mentioned above, the elastic element 23 can press the sliding block 22 in the deformation state, such that the sliding block 22 can abut against the data card 300 when the data card 300 is received in the card slot 211, and hence the data card 300 can be firmly installed on the card holder 20 and will not be detached from the card holder 20 when the card holder 20 is flipped over.

The card tray 21 further includes an upper surface 217 (as an example of the first surface) and a lower surface 218 (as an example of the second surface), and the lower surface 218 is opposite the upper surface 217. Specifically, the upper surface 217 can be parallel to the lower surface 218 to push the card holder 20 into the card socket 10 easily. When the card holder 20 needs to be installed in the card socket 10, the card holder 20 is usually rotated to a state where the upper surface 217 faces upwards and the lower surface 218 faces downwards, and then the card holder 20 is further pushed into the card socket 10.

In some embodiments, one card slot 211 is provided. The card slot 211 and the sliding groove 212 are each defined in the upper surface 217, and neither the card slot 211 nor the sliding groove 212 passes through the lower surface 218, such that the data card 300 will not fall off when the upper surface 217 faces upwards, and meanwhile the data card 300 can be installed in the card slot 211 easily, the state of the sliding block 22 can be observed easily, and the sliding block 22 can be assembled and disassembled easily.

In some embodiments, two card slots 211 are provided and include an upper card slot 2111 (as an example of the first card slot) and a lower card slot 2112 (as an example of the second card slot), and the upper card slot 2111 is defined in the upper surface 217 while the lower card slot 2112 is defined in the lower surface 218. The sliding groove 212 is defined in the upper surface 217, the sliding groove 212 passes through the upper card slot 2111 and partially penetrates into the lower card slot 2112 in a depth direction, and the sliding block 22 can abut against the data card 300 when the data card 300 is received in the upper card slot 2111 or when the data card 300 is received in the second card slot 2112, or when the date card 300 is received in each of the first card slot 2111 and the second card slot 2112. As a result, the card holder 20 can receive two data cards 300 at the same time, which expands the function of the terminal 200 and makes the structure of the card holder 20 compact. Specifically, depending on specific use requirements, the data card 300 can be installed in each of the upper card slot 2111 and the lower card slot 2112, or the data card 300 can be installed in the upper card slot 2111 instead of the lower card slot 2112, or the data card 300 can be installed in the lower card slot 2112 instead of the upper card slot 2111. The position of the upper card slot 2111 can be corresponding to that of the lower card slot 2112, and an opening depth of the upper card slot 2111 and that of the lower card slot 2112 can be the same or can be different. The sliding groove 212 passes through the upper card slot 2111 and partially penetrates into the lower card slot 2112 in the depth direction, that is, the sliding groove 212 runs through the upper surface 217 and a bottom of the upper card slot 2111, and partially penetrates into the lower card slot 2112, and the sliding groove 212 is spaced apart from the lower surface 218.

Accordingly, in some embodiments, the card tray 21 further includes a partition plate 21*a*, and the partition plate 21*a* is disposed between the upper card slot 2111 and the lower card slot 2112 and configured to separate the data card 300 received in the upper card slot 2111 from the data card 300 received in the lower card slot 2112. Thus, the partition plate 21*a* can separate two data cards 300, such that when one data card 300 is installed or uninstalled, the other data card 300 will not be affected. Additionally, the partition plate 21*a* can hold the data card 300 and prevent the data card 300 from falling off in a direction perpendicular to the upper surface 217 and the lower surface 218. Specifically, two partition plates 21*a* are provided and extend into the card slot 211 correspondingly from the second side wall 214 and the fourth side wall 216.

In some embodiments, the card tray 21 further includes a fixing groove 219, the fixing groove 219 is defined in the upper surface 217 and communicated with the sliding groove 212, and the elastic element 23 is received in the fixing groove 219. The fixing groove 219 includes a first wall 2191 adjacent to the card slot 211 and a second wall 2192 opposite the first wall 2191, and the second wall 2192 gradually extends away from the card slot 211 along a direction from two ends of the fixing groove 219 to a middle position of the fixing groove 219.

Therefore, the state of the elastic element 23 can be easily observed, and the elastic element 23 can be assembled or disassembled easily. Meanwhile, the second wall 2192 gradually extends away from the card slot 211 along the direction from two ends of the fixing groove 219 to the middle position of the fixing groove 219, that is, a width of the fixing groove 219 is gradually increased in the direction from two ends of the fixing groove 219 to the middle position of the fixing groove 219. As a result, when the elastic element 23 is deformed, friction between the elastic element 23 and the second wall 2192 is reduced, thereby prolonging the service life of the elastic element 23. Specifically, the fixing groove 219 extends along the second direction overall, and the first wall 2191 extends along the second direction. In one embodiment, two ends of the elastic element 23 are fixed at two ends of the fixing groove 219, specifically by means of gluing. In another embodiment, the elastic element 23 can abut against an inner wall of the fixing groove 219, and when the elastic element 23 is deformed, the elastic element 23 abuts against the inner wall of the fixing groove 219 and is fixed in the fixing groove 219 by means of a frictional force provided by the fixing groove 219.

In some embodiments, the sliding block 22 slides in the sliding groove 212 along a direction perpendicular to a length direction of the elastic element 23, and the elastic element 23 penetrates the sliding block 22 or the elastic element 23 extends outwardly from two sides of the sliding block 22. Thus, the elastic element 23 exerts a relatively large pressing action on the sliding block 22 when deformed. Specifically, when the elastic element 23 penetrates the sliding block 22, the elastic element 23 is in interference fit with the sliding block 22, such that the elastic element 23 and the sliding block 22 can be fitted tightly. The elastic element 23 can have a columnar or spiral shape.

In some embodiments, the sliding block 22 is located in a middle position in the length direction of the elastic element 23, and a sliding direction of the sliding block 22 within the sliding groove 212 is aligned with a middle position of the card slot 211. Thus, the two sides of the sliding block 22 are under relatively balanced pressing forces from the elastic element 23, thereby preventing the sliding block 22 from coming out of the sliding groove 212 due to unbalanced stress; the sliding direction of the sliding block 22 is aligned with the middle position of the card slot 211, thereby preventing the data card 300 from coming out of the card slot 211 when abutted by the sliding block 22.

In some embodiments, the card holder 20 further includes a handle 24, the handle 24 is coupled to an end of the card tray 21, and the sliding groove 212 is located between the card slot 211 and the handle 24. Specifically, the handle 24 is coupled to the first side wall 213 of the card slot 211, and the handle 24 is substantially perpendicular to the card tray 21, such that the user pushes the card tray 21 into the accommodating space 12 by pushing the handle 24, and meanwhile the handle 24 can be stuck outside the card socket 10 to prevent the whole card holder 20 from being inserted into the accommodating space 12, which otherwise will make it difficult for the card holder 20 to be taken out of the accommodating space 12.

Reference throughout this specification to "certain embodiments," "one embodiment," "some embodiments," "an example," "a specific example" or "some examples" means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

Although embodiments of the present disclosure have been illustrated and described, it would be appreciated by those skilled in the art that the embodiments are explanatory and cannot be construed to limit the present disclosure, and changes, modifications, alternatives and variations can be made in the embodiments without departing from the scope of the present disclosure. The scope of the present disclosure is defined by the claims and the like.

What is claimed is:

1. A card holder, configured to install a data card, comprising:
   a card tray defining a card slot and a sliding groove in communication with the card slot, the card slot being configured to receive the data card;
   a sliding block capable of linearly sliding along the sliding groove; and
   an elastic element coupled to the sliding block, fixed to the card tray, and configured to press the sliding block to make the sliding block capable of abutting against the data card when the elastic element is in a deformation state.

2. The card holder according to claim 1, wherein the card tray further comprises a first surface and a second surface opposite the first surface, the card slot is defined in the first surface and the sliding groove is defined in the first surface.

3. The card holder according to claim 2, wherein the card tray further comprises a fixing groove defined in the first surface, the fixing groove is in communication with the sliding groove, and the elastic element is received in the fixing groove; the fixing groove comprises a first wall adjacent to the card slot and a second wall opposite the first wall, and the second wall gradually extends away from the card slot along a direction from two ends of the fixing groove to a middle position of the fixing groove.

4. The card holder according to claim 3, wherein two ends of the elastic element are fixed at the two ends of the fixing groove.

5. The card holder according to claim 3, wherein the elastic element is able to abut against an inner wall of the fixing groove.

6. The card holder according to claim 1, wherein the card tray further comprises a first surface and a second surface opposite the first surface; the card slot comprises a first card slot defined in the first surface and a second card slot defined in the second surface; the sliding groove is defined in the first surface, and passes through the first card slot and partially penetrates into the second card slot in a depth direction; the sliding block is able to abut against the data card when the data card is received in the first card slot, or when the data card is received in the second card slot, or when the date card is received in each of the first card slot and the second card slot.

7. The card holder according to claim 6, wherein the card tray further comprises a partition plate provided between the first card slot and the second card slot, and the partition plate is configured to separate the data card received in the first card slot from the data card received in the second card slot.

8. The card holder according to claim 1, wherein the sliding block slides in the sliding groove along a direction perpendicular to a length direction of the elastic element, and the elastic element penetrates the sliding block or extends outwardly from two sides of the sliding block.

9. The card holder according to claim 8, wherein the sliding block is located in a middle position in the length direction of the elastic element, and a sliding direction of the sliding block within the sliding groove is aligned with a middle position of the card slot.

10. The card holder according to claim 1, wherein the sliding block comprises an abutting surface, and abuts against the data card by means of the abutting surface.

11. The card holder according to claim 1, further comprising a handle coupled to an end of the card tray, the sliding groove being located between the card slot and the handle.

12. The card holder according to claim 1, wherein the card tray exhibits a rectangular parallelepiped shape overall, and the card slot is defined by four side walls coupled end to end, the side walls comprising a first side wall, a second side wall, a third side wall and a fourth side wall.

13. The card holder according to claim 12, wherein the first side wall and the third side wall are opposite and extend along a second direction; the second side wall and the fourth side wall are opposite and extend along a first direction; the second side wall couples a first end of the first side wall and a first end of the third side wall, while the fourth side wall couples a second end of the first side wall and a second end of the third side wall.

14. The card holder according to claim 13, wherein respective thicknesses of the first side wall, the second side wall and the fourth side wall are equal.

15. The card holder according to claim 14, wherein the third side wall comprises two end portions coupled to the second side wall and the fourth side wall correspondingly, and a middle portion coupling the two end portions, a height of each end portion is equal to a height of the second side wall and a height of the fourth side wall correspondingly, and a height of the middle portion is lower than the height of each end portion.

16. The card holder according to claim 15, wherein a side of the middle portion away from the card slot defines a chamfer.

17. The card holder according to claim 12, wherein when the data card is not received in the card slot, the sliding block is inserted into the card slot by a first depth along the first direction; when the data card is received in the card slot, the sliding block is inserted into the card slot by a second depth along the first direction, and the first depth is greater than the second depth.

18. The card holder according to claim 12, further comprising a handle coupled to the first side wall of the card slot, and the handle being substantially perpendicular to the card tray.

19. An inserting device, comprising:
a card socket defining an accommodating space; and
a card holder capable of being movably inserted into or drawn out of the accommodating space, the card holder comprising:
a card tray defining a card slot and a slideway in communication with the card slot,
a slider capable of linearly sliding along the slideway, and
an elastic element coupled to the slider, fixed to the card tray, and configured to press the slider when the elastic element is in a deformation state.

20. A terminal, comprising a card holder comprising:
a card tray defining a card slot and a sliding channel in communication with the card slot,
a sliding piece capable of linearly sliding along the sliding channel, and
an elastic element coupled to the sliding piece, fixed to the card tray, and configured to press the sliding piece when the elastic element is in a deformation state.

* * * * *